United States Patent [19]
Melvin

[11] 3,821,481
[45] June 28, 1974

[54] THREE CHANNEL PSK DATA MODEM APPARATUS

[75] Inventor: William J. Melvin, Costa Mesa, Calif.

[73] Assignee: Collins Radio Company, Dallas, Tex.

[22] Filed: July 9, 1973

[21] Appl. No.: 377,463

Related U.S. Application Data

[62] Division of Ser. No. 187,675, Oct. 8, 1971, Pat. No. 3,764,743.

[52] U.S. Cl. .................. 179/15 R, 178/67
[51] Int. Cl. .................. H04l 27/20
[58] Field of Search.. 178/66, 67; 179/15 R, 15 BC, 179/84 VF; 325/30, 163, 45, 47, 145; 331/179; 332/48, 21; 307/262

[56] References Cited

UNITED STATES PATENTS 3,353,101 11/1967 Kawai .................. 178/67
3,619,501 11/1971 Nussbaumer .................. 325/60

*Primary Examiner*—David L. Stewart

[57] ABSTRACT

Apparatus for and the method of providing three channel, eight phase data modulation and demodulation whereby the system may be used for either two or three channels with no detrimental effects in either mode of operation due to the additional circuitry. The invention discloses additional apparatus for connection to a conventional two channel, four phase system to produce a three channel, eight phase system. The coding of the eight phase system modifies the basic phase change of a two channel, four phase system by ±22.5°depending upon the exclusive nor result of the first two channels as compared to the binary logic level of the third channel.

3 Claims, 7 Drawing Figures

THREE CHANNEL PSK DATA MODEM APPARATUS

This application is a division of application Ser. No. 187,675 filed 8 Oct. 1971 now U.S. Pat. No. 3,764,743, issued Oct. 9, 1973.

THE INVENTION

The present invention is generally related to electronics and more specifically related to a multiple channel, multiple phase data demodulation circuit. Even more specifically, the invention is related to a means for modifying a two channel, four phase system by the addition of a relatively few number of parts to produce a system which may be used for either two channel, four phase or three channel, eight phase.

While it is realized that attempts have been made in the past to produce three channel, eight phase systems, they have been less successful because the circuitry was extremely complex and further the units were compatible with two channel, four phase operation only.

The present invention on the other hand provides a system which requires only a few minor additional parts to the modulator and the demodulator of the transmitter and receiver portions, respectively, and which in no way interferes with two channel, four phase operation. However, they do allow the transmission and reception of a third channel in an eight phase data transmission system. Additionally, the coding described in connection with this invention has a feature whereby each coded phase message differs from both of its adjacent neighbors by one bit and from its next most adjacent neighbors by two bits. This coding scheme produces a system which is relatively insensitive to additive noise as compared to other eight phase coding schemes. In other words, the erroneous detection of any particular received signal due to a single noise bit results in only one error rather than possibly two or three errors in the detection system. This low noise sensitivity is not characteristic of coding schemes in general.

In view of the above, it is an object of this invention to provide an improved data transmission system.

Other objects and advantages may be ascertained from a reading of the specification and appended claims in conjunction with the drawings wherein:

DETAILED DESCRIPTION OF THE INVENTION

While the present invention is generally applicable to any four phase, two channel data transmission system, the present invention will be described with respect to two prior inventions originated by the present inventor and assigned to the same assignee as the present invention. The first is entitled "Digitalized Tone Generator" and issued Aug. 3, 1971, as U.S. Pat. No. 3,597,599. This invention provides a very detailed description of operation of an embodiment of such a four phase, two channel data modulator and transmitter. A second invention is described in a patent application filed May 13, 1970, and given Ser. No. 36,742 and entitled "Differentially Coherent Phase Shift Keyed Digital Demodulating Apparatus" now issued as Pat. No. 3,675,129. This patent application describes the demodulator and receiver portion of a unit which is complementary to the above-referenced issued patent. As previously mentioned, the present invention is applicable to this type of system generally and is being described with respect to these specific digital implementations for simplicity and ease of description of the additional circuitry required for one embodiment incorporating the inventive concept.

Figure 2:
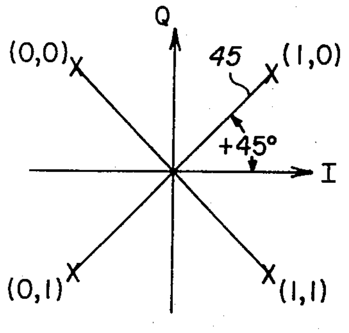
FIGS. 2 and 3 illustrate the four phase and eight phase coding of the binary logic in the present invention.

The modulator phase coding utilized in the above-referenced patent is as illustrated in FIG. 2 and Table 3 infra. As may be ascertained from the patent, the modulator is a sampled data device utilizing a seven bit phase word. The following pulse timing ($T_K$) and phase angle relationships hold as disclosed in Table 1.

TABLE 1

| Timing | $T_{64}$ | $T_{32}$ | $T_{16}$ | $T_8$ | $T_4$ | $T_2$ | $T_1$ |
|---|---|---|---|---|---|---|---|
| Angle | 180° | 90° | 45° | 22.5° | 11.25° | 5.625° | 2.8125° |

In the following discussion of operation, the logic function ⊕ is defined as exclusive NOR and has the following relationship of Table 2.

TABLE 2

| $ch_1$ | $ch_2$ | $ch_1 \oplus ch_2$ |
|---|---|---|
| 0 | 0 | 1 |
| 0 | 1 | 0 |
| 1 | 0 | 0 |
| 1 | 1 | 1 |

Finally, the following Table 3 illustrates the phase characteristics of the channels one and two with respect to the in phase and quadrature phase reference system as disclosed in FIG. 2 in the drawings for the system described in the above referenced patents.

TABLE 3

| $ch_1$ | $ch_2$ | $\Delta\Phi$ |
|---|---|---|
| 1 | 0 | +45° |
| 0 | 0 | +135° |
| 0 | 1 | −135° |
| 1 | 1 | −45° |

Figure 1:
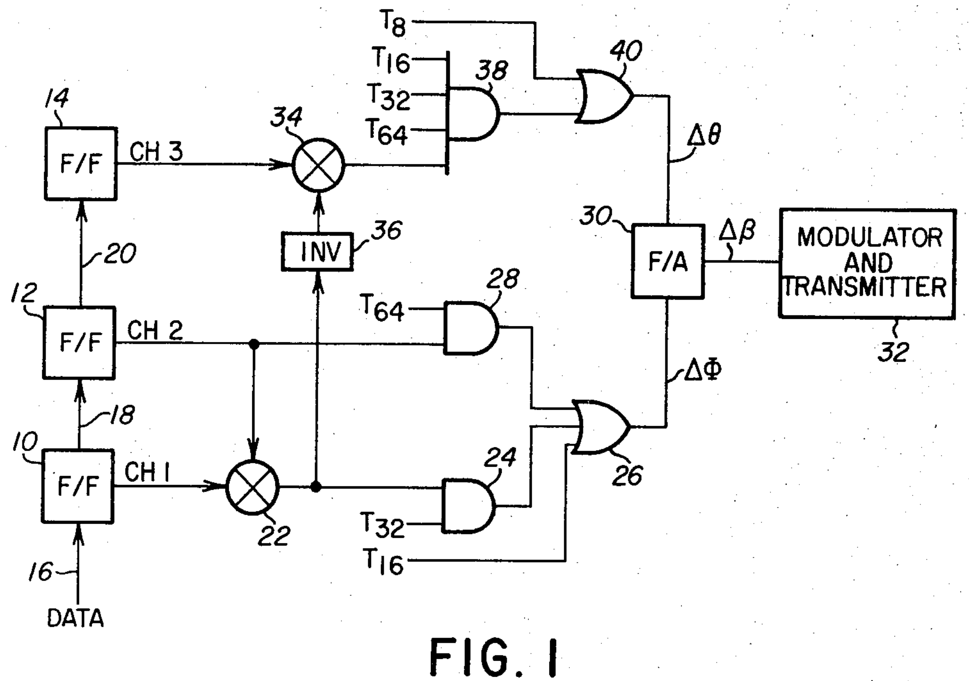
FIG. 1 illustrates the coding circuitry for implementing the modulator portion of the present invention.

In FIG. 1 three flip-flops 10, 12, and 14 are illustrated with data flowing into flip-flop 10 via a lead 16 and being further transmitted to flip-flop 12 from flip-flop 10 via a lead 18 and from flip-flop 12 to flip-flop 14 via a lead 20. Outputs from flip-flops 10 and 12 are both supplied to an inclusive OR gate 22 whose output is connected to the input of an AND gate 24. AND gate 24 also receives an input labeled $T_{32}$. Input $T_{32}$ is a timing pulse occurring in time and representative of an angle as outlined in Table 1. The output of AND gate 24 is applied to an OR gate 26 which also receives an input timing signal $T_{16}$ and an output from an AND gate 28. AND gate 28 receives an input from flip-flop 12 and also a $T_{64}$ timing pulse. An output ($\Delta\Phi$) from OR gate 26 is supplied to a full adder 30 whose output ($\Delta\beta$) is supplied to a modulator and transmission system 32. The signal $\Delta\Phi$ is the phase shift for four phase operation.

Other than the flip-flop 14 and the full adder 30, the apparatus described above is contained in the above-referenced tone generator patent. The flip-flops 10 and 12 may be considered to be flip-flops 308 in FIG. 17 of the patent with the exclusive NOR gate 22 of FIG. 1 being represented by inclusive OR gate 329 in FIG. 17 and AND gates 24 and 28 corresponding to 321 and 394. Finally, the OR gate 26 is represented by OR gates 322 and 395. The full adder 30, however, is not the full adder 314 but is an additional full adder required to add the signal from the remaining circuitry.

An output from flip-flop 14 is supplied to an inclusive OR gate 34 which receives an output from exclusive NOR gate 22 through an inverter 36. An output from exclusive NOR gate 34 is supplied to a multiple AND gate 38 which has an output supplied to an OR gate 40. The OR gate 40 also receives a $T_8$ input and supplies an output which is a second input to full adder 30. Referring back to AND gate 38, it will be realized that this is a complex logic circuitry comprising AND gates and an OR gate such that it will provide an output when there is an input and any one of the inputs $T_{16}$, $T_{32}$, or $T_{64}$.

Referring now to FIG. 2 it will be noted that there are in-phase and quadrature-phase reference lines or indicators designated as I and Q, respectively. Further, there is a phase vector 45 intermediate the reference designators I and Q labeled (1, 0) to indicate this vector is indicative of a logic 1 in channel 1 and a logic zero in channel 2. This vector 45 is in phase quadrant 1. This vector is at an angle of +45° with respect to the reference vector I. Other vectors are shown in phase quadrants 2, 3, and 4 at angles of +135°, 225°, and 315°, respectively. However, the last two vectors are normally designated as −135° and −45°, respectively.

Some phase shift keying systems utilize the phase of the last transmitted signal as a reference and then automatically shift the next transmitted signal 45° plus a multiple of 90°. This multiple may be 0, 1, 2, or 3. This will result in the disclosed phase shifts of FIG. 2. Referring to the chart of Table 3 in combination with the drawing of FIG. 1, it will be noted that if the binary data in channel one is a logic 1, while the binary data in channel two is a logic 0, the phase shift will be the minimum shift of 45°. However, if both channels are logic 1 then the phase shift will be 315° or −45° and will result in the phase vector appearing in quadrant 4.

In practicing the present invention, the four phase modulation system of the prior art is modified by adjusting the phase of the transmitted signal by an amount so that it may be distinguished from other phase shifts and providing an additional channel of information. The embodiment shown uses a coding scheme whereby the phase is adjusted to be 22.5° closer to the in phase channel when the third channel is indicative of a binary one and is adjusted to be 22.5° closer to the quadrature phase channel when the information is indicative of a binary 0.

Figure 3:
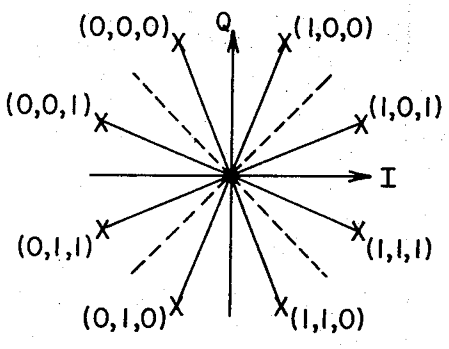

In FIG. 3 the in and quadrature phase reference lines are shown as in FIG. 2 and dash lines are shown to illustrate the position of the vectors of FIG. 2. However, the solid lines are disclosed as the modification of the four phase output. The phasors of FIG. 3 each have a designator following for providing information respectively as to the first, second, and third channel and their binary data values. Thus, the first phasor above the in phase reference line indicates that the data in channels one and three is a logic 1 and a logic 0 in channel two. The other phasor in phase quadrant 1 indicates that this is representative of a logic 1 in channel one but logic 0's in both channels two and three. Table 4 illustrates all of the phasor angles for each combination of binary data with respect to the in phase reference I.

TABLE 4

| $ch_1$ | $ch_2$ | $ch_3$ | $\Delta\beta$ |
|---|---|---|---|
| 1 | 0 | 1 | 22.5 |
| 1 | 0 | 0 | 67.5 |
| 0 | 0 | 0 | 112.5 |
| 0 | 0 | 1 | 157.5 |
| 0 | 1 | 1 | −157.5 |
| 0 | 1 | 0 | −112.5 |
| 1 | 1 | 0 | −67.5 |
| 1 | 1 | 1 | −22.5 |

As may be ascertained through the use of Tables 2 and 4, the coding employed in the present embodiment is such that when the exclusive NOR result of channels one and two is the same as channel three, then the phasor of FIG. 2 is advanced 22.5° while it is retarded 22.5° if the exclusive NOR result of channels one and two is different from channel three. This is brought out more clearly in the following Table 5.

TABLE 5

| $ch_1 \oplus ch_2$ | $ch_3$ | $\Delta\theta$ |
|---|---|---|
| 0 | 0 | +22.5 |
| 0 | 1 | −22.5 |
| 1 | 0 | −22.5 |
| 1 | 1 | +22.5 |

It may be noted from observation of FIG. 3 that, after modification of a given vector of FIG. 2, the resulting vector, whether positive or negative 22.5°, is still in the same phase quadrant. Since most prior art detection scheme systems merely determined the particular phase quadrant for two channel, four phase operation, these systems would still operate satisfactorily on two of the channels in receiving the signal carrying three channel, eight phase coded information. The prior art systems without the present modification would merely be unable to receive the third channel of information. Systems containing the present modification and in the same receiving zone would be able to detect all three information channels. Some types of coded diversity systems may advantageously desire to operate in this manner so that certain stations would receive only two channels of information while other stations would receive all three channels of information. The I and Q channels would carry the data and channel 3 would carry a parity bit. The data and parity bits would be coded over a larger number of times (16) such that bursts of three to six errors per frame (48 bits) could be detected and corrected.

In operation, and with reference to the information contained in the above referenced U.S. Pat. No. 3,597,599, it may be assumed that the flip-flops 10, 12, and 14 contain binary data levels of 1, 0, and 1, respectively. It will be noted that at time $T_{16}$ a pulse will be supplied through the OR gate 26 to full adder 30. This will represent 45°. Since flip-flop 10 contains a logic 1 and flip-flop 12 contains a logic 0, the output of exclusive NOR gate 22, according to Table 2, will be a logic 0. Thus, a logic 0 will be obtained from the output of AND gate 24 at time $T_{32}$. With the output of flip-flop 12 being a logic 0 as previously mentioned, there will be a logic 0 output from AND gate 28 at time $T_{64}$. Thus, the only phase shift signal to full adder 30 from the lower portion of four phase portion of the circuit is a +45° signal from the $T_{16}$ input. Referring to FIGS. 2 and 3, it will be noted that the 1–0 binary data for channels one and two in both drawings occur in phase quadrant 1. Thus, the explanation coincides with the figures thus far.

Referring now to the remaining portion of the circuitry in FIG, 1, it will be noted that the logic 0 output from exclusive NOR gate 22 will be inverted in inverter 36 and applied as a logic 1 to exclusive NOR gate 34. Since it was previously assumed that flip-flop 14 contains a logic 1, the combination of two logic 1's in exclusive NOR gate 34 will produce a logic 1 output and thus outputs will be obtained from AND gate 38 at times $T_{16}$, $T_{32}$, and $T_{64}$. These outputs will be supplied through OR gate 40 to full adder 30. An additional input is supplied to full adder 30 at time $T_8$ and thus the total input to full adder 30 from OR gate 40 is a digital signal indicative of 337.5° or −22.5°. Thus, full adder 30 receives instructions from OR gate 26 to advance by 45° and from OR gate 40 to subtract 22.5° from that previously received 45° signal. Thus, the output is the difference or 22.5°.

In accordance with the above explanations, the full adder 30 receives the basic instruction to shift the phase in the same manner as outlined in the above referenced patent relating to a four phase, two channel phase shifting technique and this signal is further modified either ±22.5° by the additional circuitry utilized for the present third phase coding. This output is then supplied to the modulator and transmitter in the same manner as outlined in the above referenced patent.

FIG. 4 — DEMODULATOR MODIFICATION I

Figure 4:
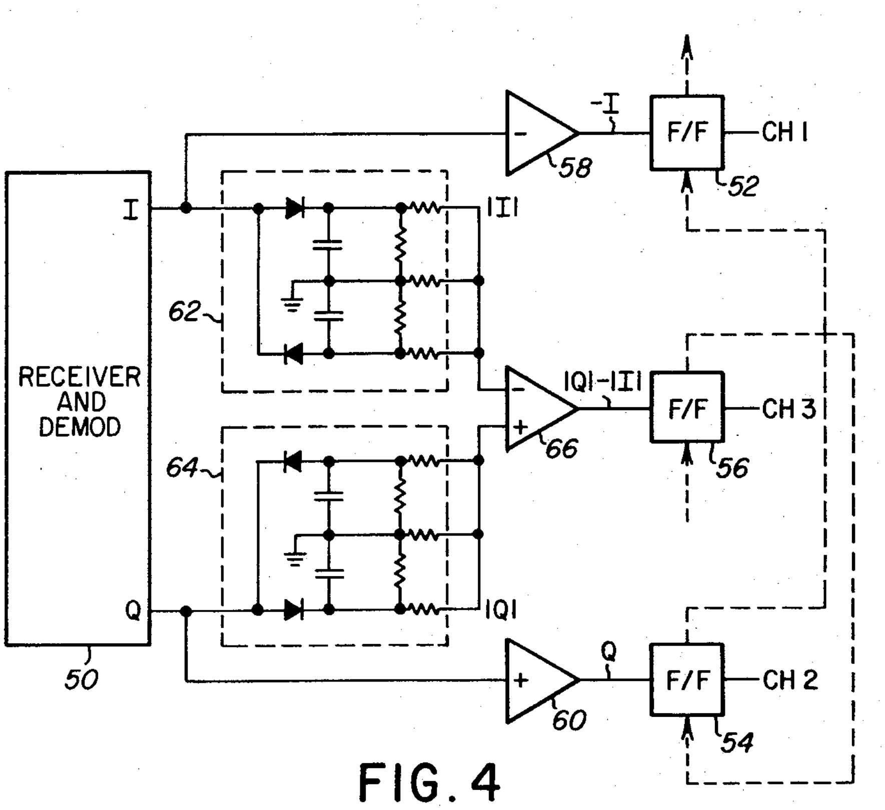
FIG. 4 illustrates one embodiment of a detection scheme for the third phase from the information previously derived for the first and second phases.
Figure 6:
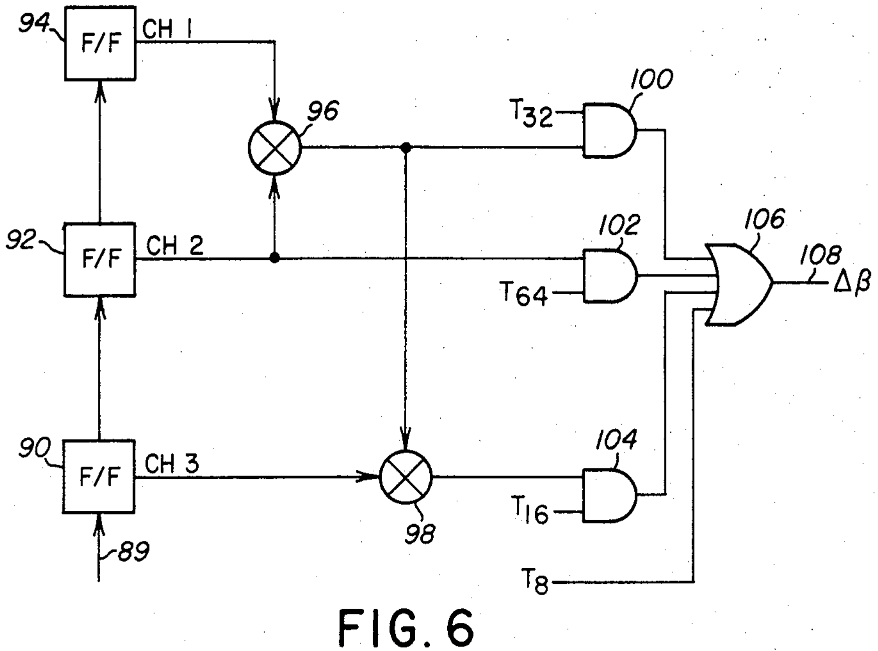
FIGS. 6 and 7 illustrate further embodiments for modulating and demodulating the coded information.

In FIG. 4 a block 50 is shown providing in (I) and quadrature (Q) phase outputs which are generally representative of the signals received and transmitted in channels one and two, respectively. Reference to FIG. 6 of the above referenced demodulating application will show these signals applied to the flip-flops 254 thereof and indicated as channels one and two in a multiple stage shift register for transmission of data out of the system to other apparatus. The present system of FIG. 4 shows these flip-flops as 52 and 54. In addition there is an additional flip-flop 56 connected intermediate for receiving the third channel information. Signal inverter 58 is also shown and a non-inverting amplifier 60 is provided between the output of 50 and the respective flip-flops. The reason for such inversion in inverter 58 is to make the output signals directly correspond to those provided at the modulator. The demodulator in the above referenced demodulator application is perfectly compatible with the modulator in the modulator patent as explained in the specification but was not described for receiving the exact phase coding described in the modulator patent. Thus, the present invention adds the inverter 58 to provide direct detection. Dash lines are shown between the flip-flops to illustrate the manner of data transfer as shown in FIG. 6 of the above referenced demodulator application. Additional circuitry of FIG. 4 is a first full wave rectifier shown within dash lines 62 and a second full wave rectifier shown within dash lines 64. The first rectifier 62 produces the absolute value of the in-phase component and supplies this to an inverting input of an amplifier 66. The rectifier 64 full wave rectifies the Q component and produces as an output the absolute value of the quadrature-phase and supplies this to the non-inverting input of amplifier 66. The output of this amplifier is then representative of the absolute magnitude of the quadrature phase less the absolute magnitude of the in-phase signal. This signal is supplied to flip-flop 56.

The present invention is adaptable for use by either analog or digital information processors. A digital information processor would normally look only at the polarity bit of information and would thus check the logic level of the polarity bit to determine the logic level of the transmitted data. Thus, if flip-flop 52 indicated that the in-phase channel were equal to or greater than 0 volts then the transmitted data in channel one must have been a logic or binary 1. However, if the signal indicates that the in-phase signal is less than 0 volts, then the data in channel one is a logic 0. Likewise, if the value of the Q signal is less than 0 volts, the binary data in channel two represents a logic 1 while it represents a logic 0 if Q is equal to or greater than 0 volts. For channel three the binary data represents a logic 1 if the absolute value of Q minus the absolute value of I is less than 0 volts and is a logic 0 if this subtraction results in an answer which is equal to or greater than 0 volts.

In the above description, each of the flip-flops 52-56 are defined to have a logic 1 if the input is less than 0 volts and a logic 0 if the input is equal to or greater than 0 volts by definition. Thus, the following Table 6 provides a summary of the above referenced description of the demodulator operation.

TABLE 6

$$ch_1 = \text{polarity } \{-I\} = 1 \text{ if } I \geqslant 0$$
$$= 0 \text{ if } I < 0$$
$$ch_2 = \text{polarity } \{Q\} = 1 \text{ if } Q < 0$$
$$= 0 \text{ if } Q \geqslant 0$$
$$ch_3 = \text{polarity } \{|Q| - |I|\} = 1 \text{ if } |Q| - |I| < 0 \text{ or } |Q| < |I|$$
$$= 0 \text{ if } |Q| - |I| \geqslant 0 \text{ or } |Q| \geqslant |I|$$

FIG. 5 — DEMODULATOR MODIFICATION II

Figure 5:
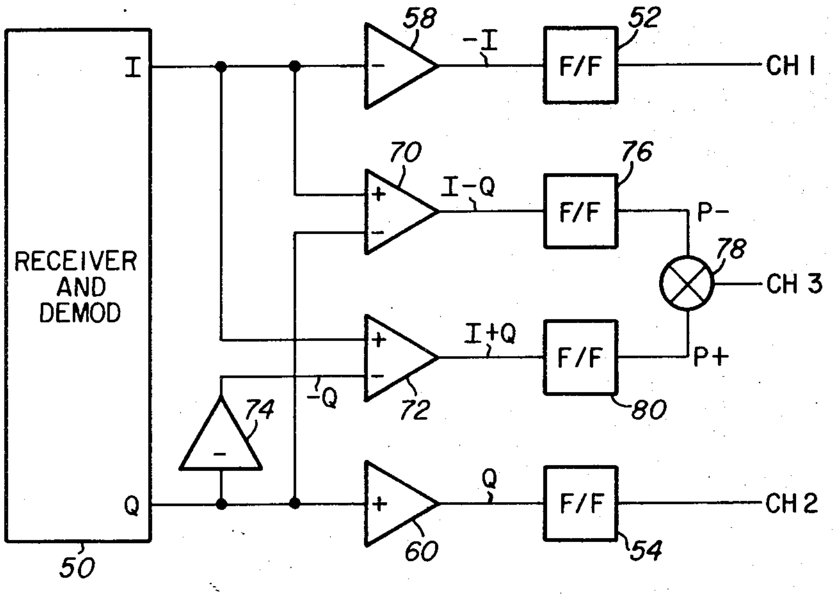
FIG. 5 illustrates an alternate embodiment for accomplishing the same result as FIG. 4.

In FIG. 5 a receiver demodulator again labeled as 50 since it is the same as in FIG. 4 provides outputs to similar amplifiers 58 and 60 as well as flip-flops 52 and 54. However, FIG. 5 contains a differential amplifier 70 connected at its inverting input to the Q phase output signal and having its non-inverting input connected to the I phase. A further differential amplifier 72 also has its non-inverting input connected to the I phase but has its inverting input connected to receive an inverted output of the Q signal via an inverter 74. The output of differential amplifier 70 is representative of the Q signal subtracted from the I or in-phase signal and is supplied to a flip-flop 76 which is then supplied to an exclusive NOR gate 78. The I + Q output of amplifier 72 is supplied to a further flip-flop 80 whose output is supplied to exclusive NOR gate 78. The output of inclusive OR gate 78 is the channel three information.

The following Table 7 illustrates the demodulator in-phase (I) and quadrature-phase (Q) outputs for the previously indicated eight phase coding technique.

TABLE 7

| I | Q | I–Q | I+Q | $ch_1$ | $ch_2$ | $ch_3$ |
|---|---|---|---|---|---|---|
| 0.93 | 0.38 | 0.55 | 1.31 | 1 | 0 | 1 |
| 0.38 | 0.93 | –0.55 | 1.31 | 1 | 0 | 0 |
| –0.38 | 0.93 | –1.31 | 0.55 | 0 | 0 | 0 |
| –0.93 | 0.38 | –1.31 | –0.55 | 0 | 0 | 1 |
| –0.93 | –0.38 | –0.55 | –1.31 | 0 | 1 | 1 |
| –0.38 | –0.93 | 0.55 | –1.31 | 0 | 1 | 0 |
| 0.38 | –0.93 | 1.31 | –0.55 | 1 | 1 | 0 |
| 0.93 | –0.38 | 1.31 | 0.55 | 1 | 1 | 1 |

The channel three decoding algorithm essentially determines if the polarities of the two signals from amplifiers 70 and 72 are the same or different. If they are the same, channel three data is indicative of a logic 1; and if they are different, an indication of channel three equaling a logic 0 results. The decoding algorithms are summarized in the following Table 8.

TABLE 8

$$ch_1 = \text{polarity}\{-I\} = 1 \text{ if } I \geq 0; \quad = 0 \text{ if } I < 0$$

$$ch_2 = \text{polarity}\{Q\} = 1 \text{ if } Q < 0; \quad = 0 \text{ if } Q \geq 0$$

$$ch_3 = \text{polarity}\{I-Q\} \oplus \text{polarity}\{I+Q\} \quad = 1 \text{ if } P- = P+; \quad = 0 \text{ if } P- \neq P+$$

As will be realized, both of the above techniques of FIGS. 4 and 5 are operable for both four phase and eight phase received signals. The additional circuitry merely adds components which are not detrimental to the operation of four phase signals if only four phase is being received. However, it can be used when eight phase signals are being received.

MODULATOR OF FIG. 6

Substantially the same results can be obtained as are obtained in FIG. 1 by the circuitry connection of FIG. 6. As will be noted, FIG. 6 eliminates several logic circuit components from that disclosed in FIG. 1. However, utilizing the information presented in Tables 1, 2, and 4, it may be determined that the same data inputs for each of the three channels will produce the same phase shift at the output $\Delta\beta$.

Although the various components of FIG. 6 have been given designating numbers, further description as to operation is believed unnecessary in view of that already provided in conjunction with FIG. 1.

DEMODULATOR OF FIG. 7

Figure 7:
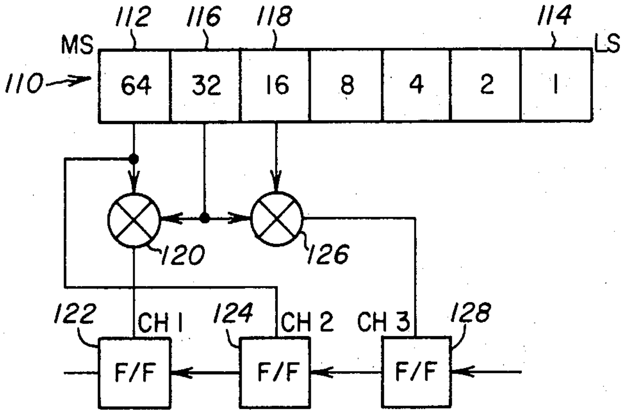

In FIG. 7 a seven-digit phase updating block 110, which may take the form of a shift register, is illustrated having data bit portions ranging from a most significant bit portion 112 to a least significant bit 114. The second and third most significant bit portions are labeled 116 and 118. Outputs from bit portions 112 and 116 are exclusive NORed in a logic gate 120 whose output is provided to a channel 1 flip-flop 122. The output of bit 112 is supplied directly to a channel 2 flip-flop 124. The outputs of bit portions 116 and 118 are exclusive NORed in a logic circuit 126 and supplied to a flip-flop 128.

The previously referenced digital demodulator patent incorporates a difference angle generator 195 which contains the digital phase update angle representation. The phase update angle is the difference angle between the angle previously received with respect to a given reference and that phase angle presently received with respect to that same reference. As will be ascertained from a reading of my previous demodulating application, this angle generator 195 contains the phase update angle for each of 17 different tones. The present invention has been explained with respect to only a single channel and the block 110 of the present FIG. 7 would be considered as seven consecutive bits in generator 195 of the previously referenced application which represent a phase update angle for a specific tone.

The demodulators of FIGS. 4 and 5 utilize the in-phase and quadrature-phase information or in other words the X and Y components for determining the data in channels 1 and 2 as shown in the referenced invention. However, the same information may be logically obtained by going directly to the phase update angle. The referenced digital demodulating application was explained utilizing the in-phase and quadrature-phase components because the use of this method of demodulation coincided with an error detection scheme using tone diversity. In other words, the utilization of the same data on each of two different tones wherein there was enough frequency difference between tones so that fading in one channel would not be accompanied by fading in the other channel.

Returning now to FIG. 7, it may be ascertained that if the transmitted signal, as applied to the modulator for example, is an angle of 22.5°, reference to Table 1 will indicate that bit portions 112, 116, and 118 contain logic 0's. The exclusive NOR combination of the outputs of these three bit portions will provide logic 1's to flip-flops 122 and 128 (channels 1 and 3) and will provide a logic 0 to channel 2 (flip-flop 124). As may be ascertained from Table 4, this is the coding which was used in the modulator when a 22.5° output was obtained as $\Delta\beta$.

Following through on each of the other phase angles will disclose that the decoding circuitry of FIG. 7 will provide the corresponding data bit representations for each of the remaining phase angles as transmitted by either of the modulators of FIG. 1 or FIG. 6.

In summary, the present coding technique is not the only code that may be used to practice the invention and the illustrated embodiments of modifying the modulator and demodulator are not the only embodiments usable in practicing the referenced code. Thus, I wish to be limited not by the embodiment shown but only by the scope of the appended claims.

I claim:

1. A phase modulated data transmission system for simultaneously passing three data information channels comprising, in combination:

modulator means for combining binary data in first, second, and third data channels whereby an output phase shift is obtained such that in a conventional four quadrant phase shift system the data for channels one and two are equal in bit logic value in phase quadrants two and four and unequal in bit logic value in phase quadrants one and three and the output phase shift is closest to the in-phase reference in each of the quadrants when the third data channel is a binary 1 and closest to the quadrature phase reference when the third data channel is a binary 0;

transmitter means connected to said modulator means and transmitting outputs indicative of the phase shifts received from said modulator means;

receiver means for receiving signals from said transmitter means via a communication link and providing a phase shifting output indicative of the received signal; and demodulator means connected to said receiver means for receiving said phase shifting output therefrom and providing equivalent outputs for data channels one and two when the received output is in phase quadrants one and three and unequivalent outputs when the received output is in phase quadrants two and four, said demodulator means further providing binary 1 outputs for data channel three when the received output is closest to the in-phase reference and providing a binary 0 to output for data channel three when the received output is closest to the quadphase reference.

2. Apparatus as claimed in claim 1 wherein said modulator means comprises:

first, second, and third binary logic means for providing binary data indications of first, second, and third channels, respectively;

first exclusive NOR logic means connected to said first and second data sources and providing an exclusive NOR output indicative of data received from said first and second sources;

first, second, third, and fourth pulse timing source means each indicative of different phase relationships;

AND gate means connected to receive the output from said first exclusive NOR means and to receive said third pulse timing signal and for providing an output;

second AND gate means connected to said second binary logic means for receiving signals therefrom and further connected to said fourth pulse timing source means for receiving signals therefrom and for providing a second output;

OR gate means connected to said first and second AND gates and to said second pulse timing source means for receiving signals therefrom and providing an output;

inverting exclusive NOR means connected to the output of said first exclusive NOR means for inverting and exclusive NORing the output therefrom with an output received from said third data source means, said inverting exclusive NOR means providing an output indicative of the received signals;

third AND gate means connected to said second, third, and fourth pulse timing source means for receiving timing signals therefrom and connected to said inverting exclusive NOR means for receiving signals therefrom, said third AND gate means providing outputs indicative of the simultaneous occurrence of the output from siad inverting exclusive NOR gate means and any one of said signals from second, third, and fourth pulse timing source means;

second OR gate means connected for receiving outputs from said third AND gate means and from said first pulse timing source means and for providing outputs indicative thereof; and full adder means connected for receiving the output signals from said first and second OR gate means and providing an output indicative of the full binary addition thereof.

3. Apparatus as claimed in claim 1 wherein said demodulator means comprises:

first, second, and third digital sources indicative in the logic 1 condition of 180°, 90°, and 45°, respectively;

first, second, and third data storage units for storing the phase angle to channel data information, respectively;

means connecting said first digital source to said second storage means;

first exclusive NOR gate means connecting the outputs of said second and third digital source to said first storage means; and second exclusive NOR means connecting the outputs of said second and third digital sources to said third storage means.

* * * * *